(12) United States Patent
Kadar-Kallen et al.

(10) Patent No.: US 8,511,909 B2
(45) Date of Patent: Aug. 20, 2013

(54) EXPANDED BEAM CONNECTOR

(75) Inventors: Michael Aaron Kadar-Kallen, Harrisburg, PA (US); Soren Grinderslev, Hummelstown, PA (US); Randall Bobby Paul, Elizabethville, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 109 days.

(21) Appl. No.: 12/756,600

(22) Filed: Apr. 8, 2010

(65) Prior Publication Data

US 2010/0189395 A1 Jul. 29, 2010

Related U.S. Application Data

(63) Continuation of application No. 11/881,975, filed on Jul. 30, 2007, now Pat. No. 7,722,261.

(60) Provisional application No. 60/834,758, filed on Jul. 31, 2006.

(51) Int. Cl.
*G02B 6/38* (2006.01)

(52) U.S. Cl.
USPC .............. 385/74; 156/160; 29/428; 385/72; 385/80

(58) Field of Classification Search
USPC ............... 385/72–80, 92; 156/160; 29/428
See application file for complete search history.

(56) References Cited

U.S. PATENT DOCUMENTS

| | | | |
|---|---|---|---|
| 3,950,075 A * | 4/1976 | Cook et al. ............... | 385/93 |
| 4,707,067 A | 11/1987 | Haberland et al. | |
| 4,790,618 A * | 12/1988 | Abe .......................... | 385/93 |
| 5,216,730 A * | 6/1993 | Demeritt et al. ......... | 385/33 |
| 5,271,079 A * | 12/1993 | Levinson .................. | 385/46 |
| 5,315,680 A | 5/1994 | Musk et al. | |
| 5,347,604 A | 9/1994 | Go et al. | |
| 5,388,171 A | 2/1995 | Michikoshi et al. | |
| 5,526,455 A * | 6/1996 | Akita et al. .............. | 385/93 |
| 5,533,159 A | 7/1996 | Okochi et al. | |
| 5,586,207 A * | 12/1996 | Goodwin .................. | 385/92 |
| 5,604,361 A | 2/1997 | Isaksson | |
| 5,737,465 A | 4/1998 | Okochi | |
| 5,745,625 A * | 4/1998 | Aikiyo et al. ............ | 385/94 |
| 5,855,503 A * | 1/1999 | Csipkes et al. .......... | 451/41 |
| 5,940,564 A * | 8/1999 | Jewell ...................... | 385/93 |
| 5,973,862 A * | 10/1999 | Hashizume ............... | 359/819 |
| 6,206,582 B1 * | 3/2001 | Gilliland .................. | 385/92 |
| 6,419,405 B1 | 7/2002 | Boscha | |
| 6,540,412 B2 | 4/2003 | Yonemura et al. | |
| 6,742,938 B2 | 6/2004 | Tanaka et al. | |
| 6,931,181 B2 * | 8/2005 | Jewell et al. ............ | 385/49 |
| 7,036,998 B2 * | 5/2006 | Tonai et al. ............. | 385/88 |
| 7,077,576 B2 | 7/2006 | Luther et al. | |
| 7,298,942 B2 | 11/2007 | Blasingame et al. | |
| 7,796,850 B2 * | 9/2010 | Jewell et al. ............ | 385/33 |

(Continued)

*Primary Examiner* — Ellen Kim

(57) ABSTRACT

An optical connector comprising: (a) a lens; (b) a ferrule assembly comprising a ferrule with an endface and at least one fiber in the ferrule having a fiber end presented at the endface; (c) a housing for holding the ferrule assembly and the lens in a certain axial and radial relationship; and (d) a glass element having a first and second surface, the first surface affixed to the endface such that it is in physical contact with the fiber end, the second surface having an AR coating and defining a space between it and the lens.

8 Claims, 3 Drawing Sheets

(56) References Cited

U.S. PATENT DOCUMENTS

| | | | |
|---|---|---|---|
| 2001/0004414 A1* | 6/2001 | Kuhn et al. ............ 385/93 |
| 2002/0197020 A1 | 12/2002 | Qian et al. |
| 2003/0021543 A1 | 1/2003 | Mann et al. |
| 2003/0210874 A1 | 11/2003 | Souda et al. |

* cited by examiner

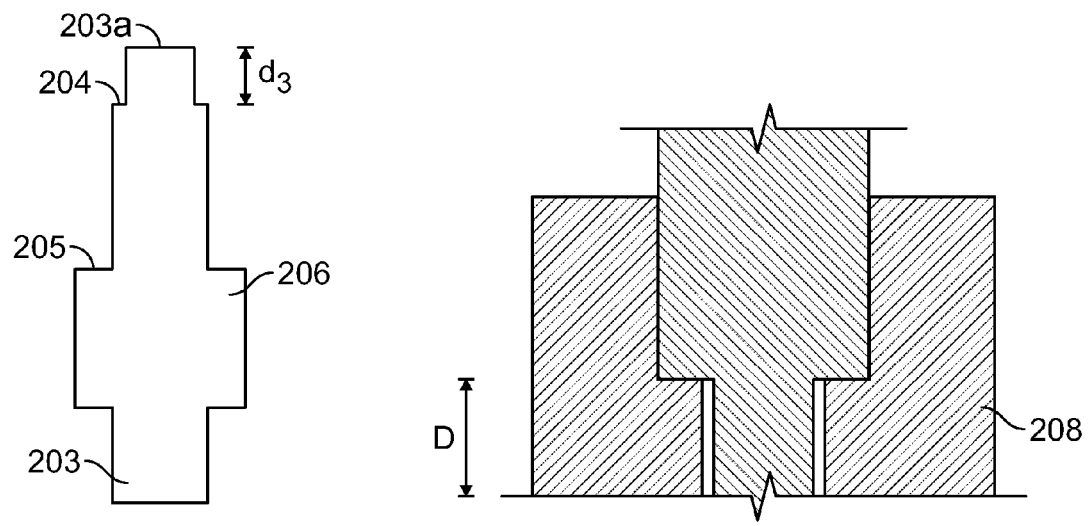
FIG. 2C             FIG. 3
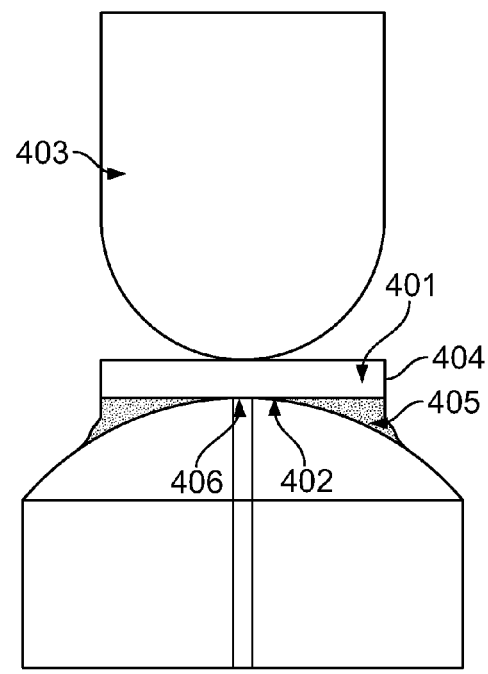
FIG. 4

EXPANDED BEAM CONNECTOR

CROSS-REFERENCE TO RELATED APPLICATIONS

This application is a continuation of U.S. patent application Ser. No. 11/881,975 filed Jul. 30, 2007, which claims the benefit of U.S. Provisional Application No. 60/834,758 filed Jul. 31, 2006, both of which are hereby incorporated by reference.

FIELD OF THE INVENTION

The present invention relates generally to an optical connector, and, more specifically, to an expanded beam optical connector.

BACKGROUND OF THE INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein are "expanded beam" optical connectors. Such connectors are used traditionally in high vibration and/or dirty environments, where "physical contact" between the fiber and the light path of mating connector is problematic. Specifically, in dirty environments, particulates may become trapped between connectors during mating. Such debris has a profoundly detrimental effect on the optical transmission since the particles are relatively large compared to the optical path (e.g., 10 microns diameter in single mode) and are therefore likely to block at least a portion of the optical transmission. Furthermore, in high-vibration environments, optical connectors having ferrules in physical contact tend to experience scratching at their interface. This scratching diminishes the finish of the fiber end face, thereby increasing reflective loss and scattering.

To avoid problems of debris and vibration, a connector has been developed which expands the optical beam and transmits it over an air gap between the connectors. By expanding the beam, its relative size increases with respect to the debris, making it less susceptible to interference. Further, transmitting the beam over an air gap eliminates component-to-component wear, thereby increasing the connector's endurance to vibration. Over the years, the expanded beam connector has evolved into a ruggedized multi-fiber connector comprising an outer housing which is configured to mate with the outer housing of a mating connector, typically through a screw connection. Contained within the outer housing are a number of inner assemblies or "inserts." Each insert comprises an insert housing, a ferrule assembly contained within the insert housing and adapted to receive a fiber, and a ball lens at a mating end of the insert housing optically connected to the fiber. The ball lens serves to expand and collimate light at the connector interface. When two expanded beam connectors are mated, there is an air gap between the ball lenses of each pair of optically coupled inserts.

Tyco Electronics Corporation (Harrisburg, Pa.) currently offers a line of expanded beam connectors under the brand name PRO BEAM® Referring to FIGS. 5(a) & (b), the single mode and multimode PRO BEAM® connectors 41, 42 are shown schematically. The single mode (SM) expanded beam connector 41 uses a PC-polished ferrule 43 that is in contact with a glass ball lens 44. (Note: a Physical Contact (PC) polish is slightly rounded, and the surface of the fiber is nominally perpendicular to the fiber axis. See, for example, Telcordia GR-326.) The lens 44 is AR coated on one side for a glass/glass interface, and, on the other side, for an air/glass interface.

The multimode (MM) connector 42 of FIG. 5(b) uses a flat-polished ferrule 45 which is held at a fixed distance from the ball lens 46 by means of a stop 47 that is located near the ball lens. The ball lens has an antireflective (AR) coating 48 for an air/glass interface to reduce Fresnel losses.

Therefore, the SM connector differs from the MM connector in that the ball lens and the ferrule are in physical contact, and the ball lens has a different AR coating on two sides.

Although the multimode and single mode expanded beam connectors offered by Tyco have consistently met industry requirements, applicants have identified a need for (1) improved performance, (2) lower costs, and (3) enhanced durability.

Practical limitations significantly limit the return loss of the current SM expanded beam connector. Specifically, the connector has a specified return loss of greater than 34 dB. To achieve this return loss, the ball lens must be coated with an AR coating that reduces reflections at the fiber/lens interface. Although reflection at this interface can be reduced theoretically to zero, typically only a reflectivity of 0.025% (36 dB return loss) is achieved. When the fiber is in contact with the ball lens, the index of refraction of the ball lens should be almost exactly 2 to achieve the lowest possible loss for a mated connector pair. The ball lens used, however, has an index that is slightly less than 2 at the SM wavelengths 1310 and 1550 nm. As a result, the loss is 0.3 dB higher than the ideal case.

Applicants also recognize that, to reduce inventory costs and requirements, the SM and MM connectors should share as many components as possible. Although the two current connectors are similar, the MM and SM inserts are distinct parts. Additionally, the inserts for different wavelength applications (e.g., 850 and 1300 nm) are also different parts since the distance between the ferrule and lens must be adjusted to accommodate different ball lens focal lengths which are a function of wavelength. The number of parts is further compounded by the fact that most varieties of the PRO BEAM™ connector are stocked in 1, 2, and 4 channel versions as well as in different form factors. The large variety of parts needed to fulfill the different connector permutations creates logistical problems that complicate supply chains and necessitate large inventories.

Applicants also recognize that using specialty components adversely affects the connector's cost and production time. Specifically, the SM connector uses a lens material that is more expensive than the lens used for the MM connector. This lens material is also more difficult to obtain since it is a specialty order.

For these reasons, a need exists for a family of MM and SM expanded beam connectors which are similar in design to reduce parts inventory, but also deliver the desired performance and vibration resistance. The present invention fulfills this need among others.

SUMMARY OF THE INVENTION

The present invention provides an expanded beam connector configuration having an optical interface between the fiber and the lens that facilitates an air gap. Specifically, the optical interface of present invention uses a simple glass element affixed to a fiber-containing ferrule and coated with an anti-reflective (AR) material. Using the AR coated glass element affixed to the ferrule assembly provides for a number of important benefits.

First, the air gap provides for a connector design in which components can be shared between single mode and multimode connectors. Specifically, the design of the present invention eliminates the physical contact between the ferrule assembly and the lens in the single mode connector, thereby rendering it similar to the multimode connector design. This configuration avoids the need to provide a lens AR coated one side for a glass/glass interface and the other side for an air/glass interface. Rather, a lens AR coated for only an air/glass interface can be used for both connector types. Indeed, in a preferred embodiment, the same lens is used for both single and multimode connectors. Thus, the design of the present invention not only reduces the cost of the lens for the single mode connector, but also reduces inventory costs since only one lens is used for both the single mode and multimode connectors in a preferred embodiment.

Furthermore, since the physical configuration of the SM and MM ferrule assemblies are the same, they can be installed in the same insert. Not only does this reduce the number of components used in the family of connectors, but also it facilitates mixing and matching SM and MM ferrule assemblies in the same connector. Such flexibility has not been available to date.

In addition to the air gap eliminating the need for a relatively expensive, specifically-manufactured lens, it improves the performance of the insert. Furthermore, since an AR coated glass element may be used at the air interface for all expanded beam connectors, higher return losses are realized in the multimode connector as well.

Providing an air gap at the interface of the ferrule assembly and the lens also allows for the independent movement of the ferrule with respect to the lens without damage to the components. In other words, since the components are not in contact, their vibration or other movement will not cause them to wear against each other. Additionally, since they are not in contact, the ferrule assembly may be rotated with respect to the lens for tuning purposes. This is not a viable option if the ferrule assembly contacts the ball lens in which case such rotation would scratch the components at their interface.

Additionally, by eliminating the physical contact between the ferrule assembly end face and the ball lens, there is no need to bias the ferrule assembly forward so that it urges against the ball lens. Rather, the ferrule assembly may be held in a fixed relationship inside the insert housing relative to the lens. This allows for alternative assembly approaches. For example, it may be preferable to employ an interference fit between the components to improve the dimensional stability of the connector over a wide temperature range.

Another advantage of the air gap is that debris does not get wedged between the lens and the ferrule as in the prior art. In the new design, such debris is not a problem, possibly because this debris can collect on the periphery of the ferrule—away from the region where the glass block and lens are in close proximity. The installer therefore is not forced to clean the ferrule and re-attempt to insert the ferrule in the insert.

The connector of the present invention also can be adjusted to accommodate different wavelength signals simply by adjusting the air gap. In one embodiment, the thickness of the glass element may be altered to change the distance from the second surface of the glass element to the ball lens. Alternatively, rather than using glass elements of different thicknesses, it may be preferable to use a profiled ferrule assembly in which the end face projects at different lengths from the surface of the ferrule assembly which registers against the stop of the insert housing. In either embodiment, since the ferrule assembly and lens are held in a fixed relationship to each other regardless of the wavelength of the signal, standardized insert housings can be used in which the stops used to register the ferrule assembly and ball lens are the same for all connectors within the family.

Finally, the glass elements suitable for the present invention are simple, discrete components, which lend themselves to manufacturability and easy inspection. With respect to manufacturability, the glass elements can be made in large sheets and diced to size. The simple nature of the device also allows the vendor to test the antireflective coating prior to its installation in the insert housing. Both the manufacturability and the ease of inspection simplify the connector, lower cost, and improve reliability.

Accordingly, one aspect of the present invention is an optical connector comprising a glass element fixed to the ferrule end face to ensure physical contact between the fiber and the glass element. In one embodiment, the optical connector comprises: A connector comprising: (a) a lens; (b) a ferrule assembly comprising a ferrule and at least one fiber disposed in the ferrule, the ferrule assembly having an endface, the endface having a dome with an apex; (c) a housing having a front and back orientation, and comprising a first stop to contact and position axially the lens; (d) a glass element having first and second surfaces, the first surface being in physical contact with the fiber; and (e) a ring of adhesive around the perimeter of the apex securing the glass element to the ferrule. In one embodiment, a space is defined between to the glass element and the lens, which may be, for example, an air gap.

Another aspect of the present invention is a process of securing the glass element to the ferrule end face to ensure physical contact between the fiber and the glass element. In one embodiment, the process comprises: (a) urging a first surface of a glass element against an apex of a domed endface of a ferrule assembly containing at least one fiber such that physical contact is made between the glass element and the at least one fiber; and (b) while urging the glass element against the apex, applying a ring of adhesive around the perimeter of the apex between the endface and the first surface.

Yet another aspect of the present invention is a connector having a ferrule assembly selected from a family of ferrule assemblies, in which the endfaces extend at varying distances from a register surface defined in the ferrule assembly. In one embodiment, the connector comprises: (a) a lens; (b) a ferrule assembly comprising a ferrule and a fiber disposed in the ferrule, the ferrule assembly having a shoulder and an endface a predetermined distance from the shoulder; and (c) a housing having a front and back orientation, and comprising a first stop to contact and position axially the lens and a second stop to contact the shoulder and position the ferrule assembly, the first and second stops being located a certain distance apart to maintain the back of the lens and the endface at a certain distance.

BRIEF DESCRIPTION OF THE DRAWINGS

FIG. 2(a)-(c) shows ferrule assemblies of an alternative embodiment.

FIG. 3 shows a polishing jig for preparing the ferrule assemblies of FIG. 2(a)-(c).

FIG. 4 illustrates a preferred process for affixing the glass element to the ferrule endface.

DETAILED DESCRIPTION OF A PREFERRED EMBODIMENT

Figure 1:
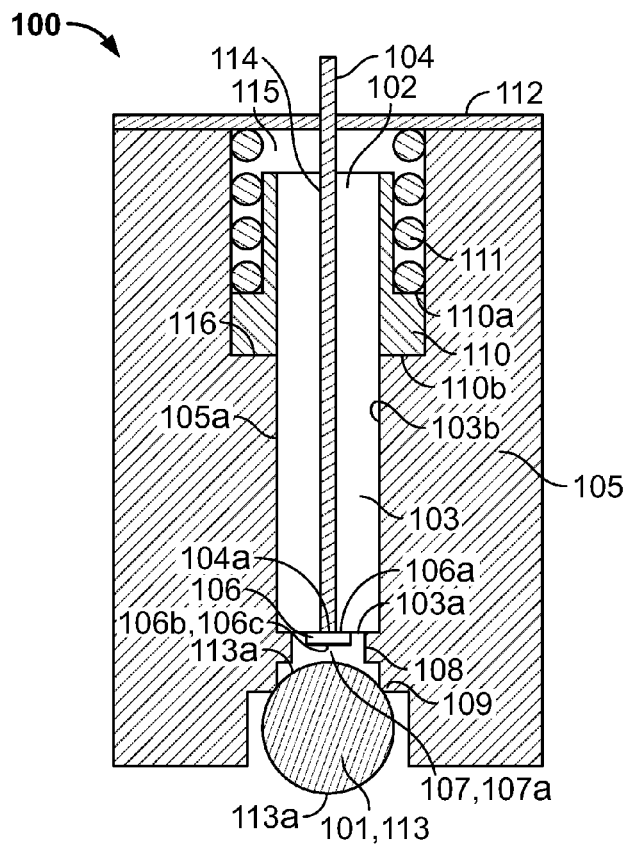
FIG. 1 shows a cross-sectional schematic of a preferred embodiment of the expanded beam connector of the present invention.

Referring to FIG. 1, an optical connector 100 of the present invention is shown. As used herein the term "connector" refers to any device used to join a segment of the conductor to (1) another conductor segment, (2) an active device such as a photonic radiation source, detector, or repeater, and (3) a passive device, such as switch, multiplexer, or attenuator. A typical optical fiber connector comprises a housing and a ferrule assembly within the housing. The ferrule assembly comprises a ferrule, which has one or more bore holes to accommodate fibers, and a fiber secured in each bore hole such that the end of the fiber is presented for optical coupling by the ferrule. The housing is designed to engage a "mating structure" having an optical path to which the fiber optically couples during mating. The mating structure may be another connector or an active or passive device as mentioned above. The optical path may be, for example, a fiber in a ferrule, a waveguide in a substrate, a lens, or an optically-transparent mass. The principal function of an optical fiber connector is to hold the fiber end such that the fiber's core is axially aligned with optical pathway of the mating structure. This way, light from the fiber is optically coupled to the optical pathway.

For illustrative purposes, connector 100 is depicted as an insert for a ruggedized connector as described above, although it should be understood that the invention is not limited to this embodiment and may be embodied alternatively in a discrete connector (i.e., a single ferrule connector) or be integral to an optical device such as a transceiver.

The optical connector 100 comprises a lens 101; a ferrule assembly 102 comprising a ferrule 103 with an endface 103a and at least one fiber 104 in said ferrule 103 having a fiber end 104a presented at said endface 103a; a housing 105 for holding said ferrule assembly 102 and said lens 101 in a predetermined axial and radial relationship; and a glass element 106 having first and second surfaces 106a, 106b, said first surface 106a affixed to said endface 103a such that it is in physical contact with said fiber end 104a, said second surface 106b having an antireflective (AR) coating 106c and defining a space 107 between it and said lens 101. Each of the components is considered in greater detail below.

The housing 105 functions to hold the ferrule assembly 102 and the lens 101 in precise axial and radial relative position. To this end, the housing 105 comprises an elongated body having a front and back orientation and defining a cavity 115 running from front to back. The cavity 115 is adapted to receive the ferrule assembly 102 from the back end. Since the ferrule assembly for the SM and MM have essentially the same physical configuration, the housing 105 is preferably generic to accept either ferrule assembly. In this particular embodiment, the housing 105 is an insert housing suitable for insertion into a larger multiconnector outer housing such as the PRO BEAM™ connector offered by Tyco Electronics Corporation. It is frequently preferred to configure the insert housing to receive a plurality of ferrule assemblies. Thus, since the SM and MM are the same, it is within the scope of the invention that an insert housing be populated with both SM and MM ferrule assemblies.

The housing also comprises a first stop 108 at a precise axial position to prevent the forward motion of the ferrule assembly relative to the insert (discussed below in greater detail with respect to the ferrule assembly), and a second stop 109 to prevent rearward movement of the lens 101.

This configuration also biases the ferrule assembly forward to ensure constant contact with the first stop 108, thereby maintaining a constant and precise spatial relationship between the lens and the endface 103a of the ferrule 103. To bias the ferrule assembly forward, the connector comprises a spring 111. The housing 105 also comprises a backplate 112 to provide a surface against which the spring 111 can push to urge the ferrule assembly forward.

The lens 101 functions, in one respect, to expand and collimate a relatively narrow optical beam emitted from a fiber into a relatively large beam for transmission through an air gap and into the light path of a mating structure, and, in another respect, to focus a relatively large collimated beam from the mating structuring into the fiber. Suitable lenses include any optical component which is capable of expanding/focusing a light beam and having a surface suitable for contacting the second stop 109 of the housing to register the axial position of the lens relative to the housing. Suitable lens include, for example, a ball lens, a GRIN lens, or a lens or lens assembly containing spherical or aspherical surfaces with uniform or graded index lenses.

In a preferred embodiment, the lens 101 is a ball lens 113 coated with an antireflective (AR) material 113a for an air/glass interface. For an air-to-glass interface, an ideal coating will have an index of sqrt(n) where n is the index of refraction of the lens material relative to air. The coating thickness is $\lambda/(4n)$ where $\lambda$ is the wavelength in air. The coating may be applied only at the region that the light path passes through the lens, or it may be applied uniformly around the ball lens 113 for simplicity and ease of manufacture (i.e., no need to align the lens in the housing).

Unlike the traditional single mode connector described above in which one hemisphere was AR coated for an air/glass interface and the other hemisphere was AR coated for a glass/glass interface, the lens of the present invention is AR coated for just an air/glass interface. In addition to facilitating manufacturing and thus lowering costs, this configuration is easier to test than the prior art ball lens having a glass/glass interface coating. That is, with a ball lens, the coating vendor is unable to accurately measure the performance of the coating in situ since the coating is defined for a glass/glass interface, whereas the in situ measurement is made with an air/glass interface. Since the present invention uses a lens with an air/glass interface coating, it can be easily measured by the coating vendor.

In a particularly preferred embodiment, the same ball lens is used for both single mode and multimode connectors. This reduces inventory requirements and, thus, costs. The lens may be secured to the housing in this respect using adhesive or any other known technique for securing a lens to a housing.

The ferrule assembly 102 functions to hold the fiber 104 in precise position relative to the lens 101 both radially and axially. In a preferred embodiment, the ferrule assembly comprises an elongated ferrule 103 having a front and back orientation with a bore hole 114 that runs from front to back. The fiber 104 is received in the back of the bore hole and the fiber end 104a is presented at the front of the bore hole, at the end face 103a of the ferrule 103. The ferrule assembly also comprises a ferrule base 110 to provide a surface 110a against which the spring 111 urges the ferrule assembly 102 forward. The ferrule base 110 as shown in FIG. 1 is an arcuate shoulder encircling the ferrule 103 at its back end.

The housing 105 receives the ferrule 103 with very narrow tolerance such that the outer surface 103b of the ferrule 103 contacts the inner surface 105a of the housing 105 to register the fiber(s) 104 contained within the ferrule in a precise radial position with respect to the housing 105. The ferrule assembly 102 also comprises a register surface 103a essentially orthogonal to the fiber to contact a stop 108 of the insert housing 105 to register the endface 103a of the ferrule assembly in a precise axial relationship with respect to the lens 101.

Although FIG. 1 shows a preferred configuration for registering the endface 103a in the housing 105, other configurations are possible and within the scope of the invention. For example, rather than using a register surface 103a on the front of the ferrule to contact stop 108, it may be beneficial to provide the register surface on the leading surface 110b of the ferrule base 110 such that it contacts shoulder 116 of the housing 105. Such a configuration is attractive since it eliminates molding or machining another feature in the housing cavity. That is, a shoulder 116 is needed already to transition the cavity from a relatively-narrow, closely-toleranced portion with inner wall 105a for receiving the ferrule 103 to a relatively-wide portion for receiving the ferrule base 110 and spring. This shoulder could also be used to function as the first stop, although the precision of the shoulder would become much more critical.

Rather than urging the ferrule assembly forward so that it abuts the first stop, it may be preferable to employ an interference fit between the ferrule assembly and the insert housing. That is, rather than having the ferrule assembly 102 moveable within the housing 105, it may be preferable to affix the ferrule assembly 102 to the housing 105. Advantages to such a configuration include, for example, improved dimensional stability over a large temperature range (i.e., the axial and radial position of the fiber endface 104a and the lens 101 remains essentially constant), and reduced number of components (e.g., the spring 111 and ferrule base 110 and backplate 112 may be eliminated).

Affixing the ferrule assembly to the housing can be performed using any known technique, including, for example, through an interference fit, adhesive bond, and welding. Preferably, the ferrule assembly is affixed to the housing through an interference fit. To this end, the insert housing may be heated or the ferrule assembly cooled to allow the insert housing to receive the ferrule assembly. As the temperature difference between the two decreases, the ferrule assembly would be secured in the insert housing by an interference fit. This technique is preferred as it allows the assembly to be reheated and the ferrule assembly removed and replaced if necessary.

Referring back to FIG. 1, the glass element 106 is affixed to the endface 103a of the ferrule. The glass element serves to provide an antireflective coating at the interface of the ferrule assembly and the ball lens. Preferably, the glass element is a glass block in which at least two of its sides are parallel planes which define the thickness of the element. Optionally, the glass element may also serve to facilitate a change in the focal point between the ferrule assembly and the ball lens to accommodate signals of varying wavelength. It should be understood, that the term "glass element" as used herein is intended to mean materials having glass-like properties of transparency and not necessarily glass per se. For example, suitable materials include glass, plastic, fused silica (doped and undoped), and quartz. In this regard, Applicants have used fused silica successfully since it matches closely the index of refraction of the glass fiber (which is fused silica that has been doped to form the core). It is also recognized that doping the fused silica tends to match the index of refraction even closer, although the cost tends to be higher too. Quartz, a mineral that is commonly referred to as a "glass" (even though it is technically not), has essentially the same properties as fused silica—although the crystalline structure can cause polarization effects.

Essential to the operation of the present invention is the antireflective (AR) coating on the surface 106b to minimize back reflection at the ferrule/lens interface. Such AR coatings are well known in optics.

Using an AR coating reduces the Fresnel loss at the air/glass interface from 0.16 dB to less than 0.01 dB. Thus, the loss of a MM mated pair is reduced by 0.3 dB compared to prior art connectors described above. Further, the return loss from the glass/air interface can be made greater than 36 dB. (Since the reflective surface is located some distance from the endface of the fiber, the return loss will be increased by a geometrical factor that is proportional to the square of the thickness of the glass plate.) As a result, the MM design can also be used for SM connectors, resulting in a lower-cost, lower-loss, more reliable design that reduces the number of insert parts that must be stocked.

Applying the AR coating directly to the ferrule would have the same result, and would eliminate any concern about the use of an epoxy at this interface. However, there are practical difficulties with directly AR coating the ferrule, and advantages to coating a substrate. First, the expanded beam connector is terminated to a cable assembly, either in a factory environment or in the field. The proposed invention is essentially an AR coating that can be done at either location. It is possible to directly AR coat the ferrules in the factory, however many cable assemblies are very large (several hundred meters) and bulky. This makes it difficult to coat the ferrules of many cable assemblies at one time, causing the cost of the AR-coated assembly to be unacceptably high. Another proposed solution is to coat "pigtails" consisting of a ferrule and fiber. These pigtails could then be spliced to the cable assembly. However, since the expanded beam connectors are often sold into environments that require "rugged" performance, the presence of a splice is often undesirable.

The new design has an air gap and glass thickness that can be adjusted to minimize the loss of the connector. By way of background, it is well known that different wavelength signals result in different focal points. To couple the light effectively between the fiber and the lens, the focal point should be coincident with the surface of the fiber. Thus, for optimum coupling efficiency, the air gap 107a should be adjustable for different wavelength signals. For example, if the ideal air gap (no glass) is H0, then this air gap can be replaced by a physical gap of H, which is composed of a glass block of thickness G and an air gap of thickness A, where $H0=A+G/n$, where n is the index of refraction of the glass. If the physical gap is a fixed distance, then the glass thickness is $G=(H-H0)/(1-1/n)$. A preferred way of determining the size of the air gap is to use commercial-available optical modeling software such as ZEMAX.

In one embodiment, the distance between ferrule and ball lens remains the same for all SM and MM connectors and the adjustment in air gap 107a is achieved by manufacturing AR-coated blocks of different thicknesses. That is, if the endface 103a of the ferrule is at a fixed distance from the lens, then glass elements of different thickness will necessarily produce connectors with different air gaps 107.

Using glass elements of varying thickness to change the air gap has a number of advantages. First, there is no increase in the number of required components for a connector which is adapted to handle a variety of optical signal wavelengths. Specifically, since different coatings are required for the different wavelengths, they can be made with varying thickness without increasing the number of parts. Additionally, the different thicknesses make it easier to distinguish the glass elements having different coatings.

Figure 2A:
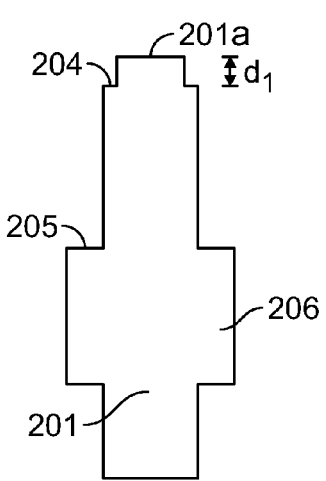
Figure 2B:
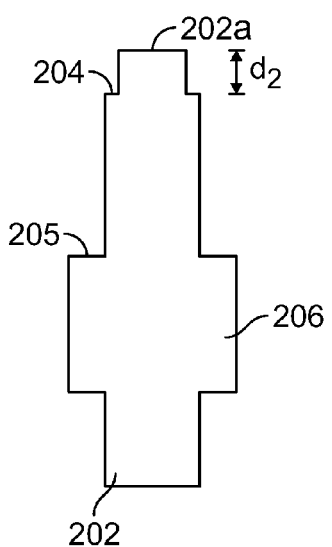
Figure 5B:
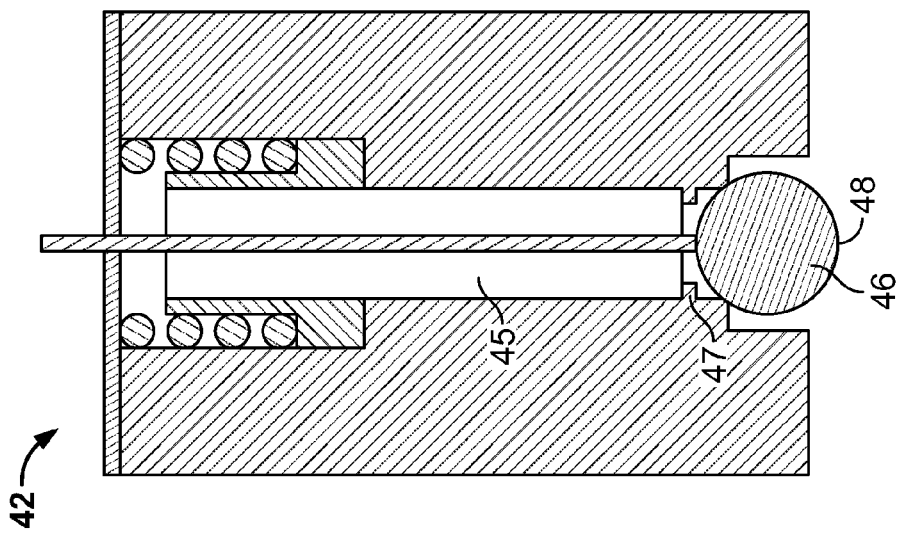
FIGS. 5(a) and (b) shows cross-sectional schematics of a prior art multimode and single mode expanded beam connectors.
Figure 5A:
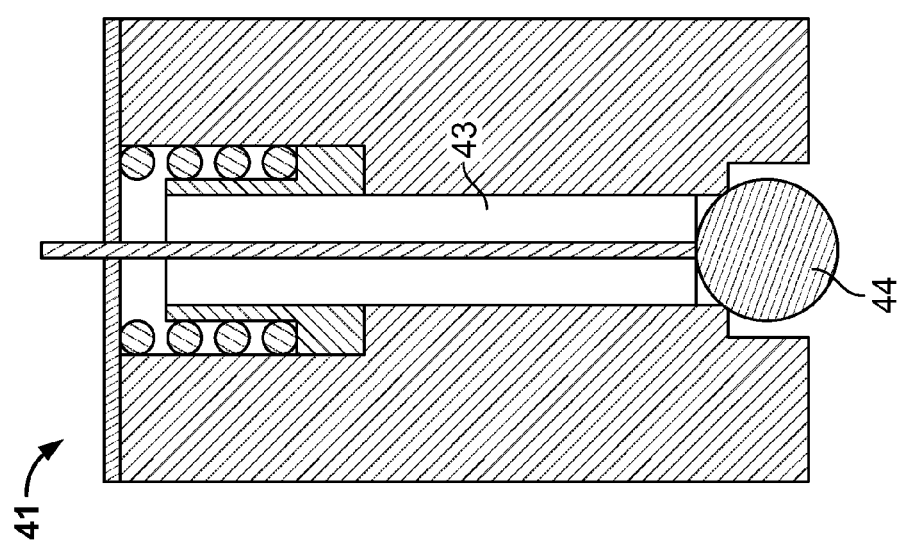

In an alternative embodiment, the connector 100 comprises a system of different ferrule assemblies, each resulting in a different air gap 107a. Referring to FIGS. 2(a)-(c), ferrule assemblies 201, 202, and 203 have endfaces 201a, 202a, 203a which extend from a register surface 204 at distances d.sub.1, d.sub.2, d.sub.3, respectively. By varying the axial position of the end face with respect to the shoulder, the air gap between the glass element and the ball lens can be adjusted to accommodate different signal wavelengths. Unlike the ferrule assembly 102 described above, the register surface 204 is not contiguous with the endfaces 201a, 202a, 203a, but rather is a shoulder with the endface stepped therefrom. Such ferrule assemblies are currently used for its angle-polished physical contact connectors. Alternatively, rather than having the endface 201a, 202a, 203a stepped up from the shoulder 204 as shown in FIGS. 2(a)-(c), respectively, the register surface may be located on the leading surface 205 of the ferrule assembly base 206.

In a preferred embodiment, ferrule assemblies having end faces which project at varying lengths from the register surface can be prepared using jigs which hold the ferrule assembly at varying lengths to the polishing surface. For example, referring to FIG. 3, a jig 208 for polishing one of the ferrule assemblies in FIGS. 2(a)-(c) is shown. It should be obvious that to effect longer lengths between the end face and the alignment shoulder, jigs having different distances D would be used. By using a polishing fixture of varying thicknesses, the protruding endface (and fiber end) is polished to a length determined by the fixture thickness D. By using separate fixture thicknesses for each wavelength, the task of varying the focal length is now removed from the insert and transferred to the ferrule polish. The ferrule polish is easily checked by a drop down gage which functions simultaneously as a check for wear of fixture thickness. Wear is minimal when using the proper fixture material since the ferrule endface to be polished is relatively small.

In the present invention, the AR-coated glass elements are fabricated by coating a larger substrate which is then diced into smaller blocks. Since the dimensions of the blocks are small (for example, often smaller than 1.75.times.1.75 mm) compared to a typical substrate (for example, 100.times.100 mm or larger), several thousand blocks preferably are coated in one coating run, resulting in a low cost per AR-coated block. Furthermore, applicants have found that coating a flat surface provides for more reliable results since the coating properties of a curved surface can be significantly different than the flat "witness" sample that the coating vendor uses to optimize coating parameters.

The glass element should be attached such that the reflection at the interface between the glass element and the fiber is minimized. To this end, the epoxy layer should be made as thin as possible since thick epoxy lines are more sensitive to temperature cycling and humidity. In addition to reducing problems with temperature and humidity, this obviates the need to match the adhesive index of refraction to that of the fiber. Therefore, preferably the thickness of the epoxy is less than $0.05 \lambda/n$, where $\lambda$ is the wavelength of the signal through air and n is the index of refraction of the epoxy. Ideally, there is no epoxy between the fiber and glass element.

It is preferable to polish the end face to provide a domed end face. A domed end face has been found to be preferable for securing to the glass element since it allows the apex of the dome to be in physical contact with the center of the glass element while the perimeter of the glass element is sufficiently separated from the endface to allow for a bead of epoxy or other adhesive to secure the glass element to the endface. The ferrule endface 103a is preferably dome polished with a radius of curvature (ROC) less than 50 millimeters, more preferably, the ROC is between 15 and 25 millimeters. This is comparable to the 10 to 25 millimeter ROC that is typically used for physical contact connectors. One way to achieve a thin epoxy line is to press the glass element and fiber into contact and then wick epoxy into the gap and/or surround the glass element/fiber interface with epoxy.

Although various methods can be derived for performing these basic steps, the following procedure has been found to produce satisfactory results. Referring to FIG. 4, the glass element 401 is placed on the fiber end face 406 and held in place with two pounds of force using a 1 millimeter diameter hemispherical brass tip 403. Prior to adding epoxy, one can determine whether the fiber is in physical contact with glass by monitoring the return loss of this interface, although it is unlikely that one would need to monitor this return loss in production. The epoxy 405 (for example, Tra-Con epoxy F253M) is then applied to one edge 404 of the glass/ferrule interface. The epoxy wicks around the entire perimeter of the glass, but does not destroy the physical contact between the glass element 401 and the fiber end face 406. During the heating, the epoxy becomes less viscous and distributes itself uniformly around the perimeter of the glass element. The return loss of the glass/fiber interface is unchanged during the curing process since physical contact is maintained. After the epoxy is cured the brass tip is removed.

The epoxy is cured at above the operating temperature of the finished device. At operating and storage temperatures, the epoxy contracts more than the other materials in the connector, pulling on the edge 404 of the glass, stretching the glass element over the curved surface of the ferrule. Epoxy shrinkage also contributes to this effect. The finished part is therefore under stress, with the epoxy providing the force that maintains physical contact between the fiber and the glass. If the ferrule is flat, or has a large radius of curvature, the small deformation of the glass provides an insufficient force to maintain contact between the fiber and the glass. The glass element used in experiments to date has been 1 millimeter square and 0.2 millimeters thick. The bending of the glass ranges from 0.5 to 0.7 micrometers as measured from center of the block to its edge.

It may be preferable to apply an AR-coated glass element to an angle polished ferrule under certain circumstances. Such circumstance include, for example, the unavailability of an adhesive that matches the index of refraction of the fiber over the operating temperature range of the glass, the oversensitivity of the index of refraction of adhesive to manufacturing parameters such as cure time and temperature, or the inadequate return loss of an AR coating alone. The use of an angle-polished ferrule requires that the ferrule be "keyed" or "locked" into a certain orientation. Such keying mechanisms are well known.

What is claimed is:

1. A connector comprising:
   a lens;
   a ferrule assembly comprising a ferrule and at least one fiber disposed in said ferrule, said ferrule assembly having an endface, said endface having a dome with an apex;
   a housing having a front and back orientation, and comprising a first stop to contact and position axially said lens;

a glass element having first and second surfaces, said first surface being in physical contact with said fiber; and a ring of adhesive around the perimeter of said apex securing said glass element to said ferrule.

2. The connector of claim 1, wherein said glass element is stressed over said apex.

3. The connector of claim 2, wherein said glass element is deformed over said apex.

4. The connector of claim 3, wherein said glass element is deflected toward said endface about 0.5 to about 0.7 microns from the center of said glass element to its edge.

5. The connector of claim 1, wherein said dome is substantially spherical and said dome has a radius of curvature (ROC) of less than 50 millimeters.

6. The connector of claim 2, wherein said second surface defines a space between it and said lens.

7. The connector of claim 6, wherein said space is an air gap.

8. The connector of claim 7, wherein said housing further comprises a second stop to contact and position said ferrule assembly, said first and second stops being located a certain distance apart to maintain the back of said lens and said endface at a certain distance.

* * * * *